US012700601B2

(12) United States Patent
Cheng et al.

(10) Patent No.: US 12,700,601 B2
(45) Date of Patent: Aug. 4, 2026

(54) FUEL CELL STACK DIAGNOSTICS USING CROWDSOURCING FOR CONNECTED FUEL CELL VEHICLE

(71) Applicant: FORD GLOBAL TECHNOLOGIES, LLC, Dearborn, MI (US)

(72) Inventors: Ming Cheng, Northville, MI (US); Rajit Johri, San Francisco, CA (US); William F. Sanderson, Jr., Commerce Township, MI (US); Matthew Riley, Ann Arbor, MI (US); Hao Wang, Ann Arbor, MI (US); Alhadi Albousefi, Dearborn, MI (US); Zeng Qiu, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 725 days.

(21) Appl. No.: 18/171,693

(22) Filed: Feb. 21, 2023

(65) Prior Publication Data

US 2023/0264606 A1 Aug. 24, 2023

Related U.S. Application Data

(60) Provisional application No. 63/312,327, filed on Feb. 21, 2022.

(51) Int. Cl.
| | |
|---|---|
| *H01M 8/04303* | (2016.01) |
| *B60L 3/00* | (2019.01) |
| *B60L 58/30* | (2019.01) |
| *H01M 8/04089* | (2016.01) |
| *H01M 8/04223* | (2016.01) |

*H01M 8/04537* (2016.01)
*H01M 8/04746* (2016.01)
(Continued)

(52) U.S. Cl.
CPC ....... *H01M 8/04303* (2016.02); *B60L 3/0053* (2013.01); *B60L 58/30* (2019.02); *H01M 8/04089* (2013.01); *H01M 8/04231* (2013.01); *H01M 8/04619* (2013.01); *H01M 8/04753* (2013.01); *H01M 8/04925* (2013.01); *H01M 2008/1095* (2013.01); *H01M 2250/20* (2013.01)

(58) Field of Classification Search
None
See application file for complete search history.

(56) References Cited

U.S. PATENT DOCUMENTS

2011/0093305 A1* 4/2011 Alexander ............. G06Q 10/06
705/7.13
2018/0215283 A1* 8/2018 Matsusue ................ B60L 58/40
(Continued)

FOREIGN PATENT DOCUMENTS

WO WO 2024150759 * 7/2024

*Primary Examiner* — Jonathan Crepeau
(74) *Attorney, Agent, or Firm* — David B. Kelley; Brooks Kushman P.C.

(57) ABSTRACT

A vehicle includes a fuel cell stack arranged to generate power for propulsion, an auxiliary fuel cell stack component, and a processor. The processor, responsive to a crowd-sourced average value of an operating parameter of an auxiliary fuel cell stack component of other fuel cell vehicles being different, for a pre-defined power level, than an average value of a same operating parameter of the auxiliary fuel cell stack component by a pre-determined amount, purge the fuel cell stack of nitrogen.

19 Claims, 3 Drawing Sheets

(51) Int. Cl.
_H01M 8/04858_       (2016.01)
_H01M 8/10_       (2016.01)

(56)                References Cited

U.S. PATENT DOCUMENTS

2024/0053158 A1*    2/2024   Nakamura  .........  G01C 21/3469
2024/0331454 A1*   10/2024   Matsui  ................  G07C 5/0808

* cited by examiner

B

A

FUEL CELL STACK DIAGNOSTICS USING CROWDSOURCING FOR CONNECTED FUEL CELL VEHICLE

CROSS-REFERENCE TO RELATED APPLICATIONS

This application claims the benefit of U.S. provisional application Ser. No. 63/312,327 filed Feb. 21, 2022, the disclosure of which is hereby incorporated in its entirety by reference herein.

TECHNICAL FIELD

The present disclosure relates to diagnosing a fuel cell stack using crowdsourcing strategies and initiating an appropriate protocol in view of the same.

BACKGROUND

A proton exchange membrane fuel cell may be used to power a vehicle. The reaction in a PEMFC involves hydrogen molecules splitting into hydrogen ions and electrons at the anode and causing the electrons to pass through an external load circuit to the cathode side, where protons re-combine with oxygen and electrons to form water and release heat. While using hydrogen is efficient, to extend the range of fuel cell powered vehicles, it may need to be compressed to approximately 700 ATM (70 MPA) to achieve an adequate fuel density.

SUMMARY

A vehicle includes a fuel cell stack arranged to generate power for propulsion, an auxiliary fuel cell stack component, and a processor. The processor, responsive to a crowdsourced average value of an operating parameter of an auxiliary fuel cell stack component of other fuel cell vehicles being different, for a pre-defined power level, than an average value of a same operating parameter of the auxiliary fuel cell stack component by a pre-determined amount, purges the fuel cell stack of nitrogen.

A vehicle includes at least one fuel cell stack arranged to generate power for propulsion, an auxiliary fuel cell stack component, and a processor. The processor, for a predefined power level, transmits data off board indicative of an average value of an operating parameter of the auxiliary fuel cell stack component, and receives a command to schedule a service event.

A data processing unit includes a processor that collects real time data indicative of, for each of a plurality of fuel cell powered vehicles, an operating parameter of an auxiliary fuel cell component, and commands a service event for at least one of the vehicles responsive to the at least one having an average operating parameter value different than an average value of the operating parameters of the plurality of fuel cell powered vehicles by an amount greater than a predefined threshold.

DETAILED DESCRIPTION

Figure 1:
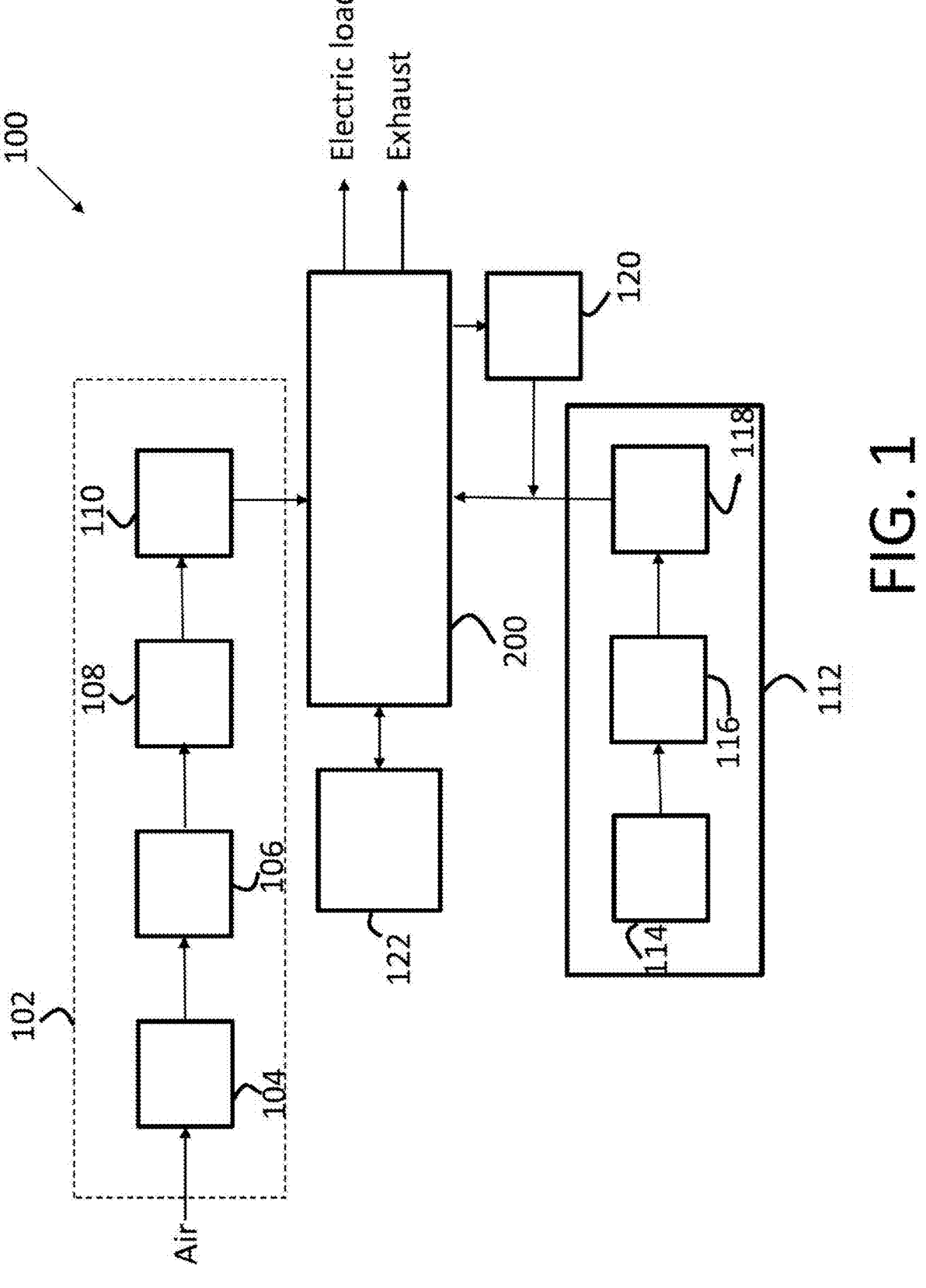
FIG. 1 is a structure diagram of a proton exchange membrane fuel cell system.

The disclosed embodiments are merely examples and other embodiments can take various and alternative forms. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As used in the specification and the appended claims, the singular form "a," "an," and "the" comprise plural referents unless the context clearly indicates otherwise. For example, reference to a component in the singular is intended to comprise a plurality of components.

Proton exchange membrane fuel cells (PEMFC) are a popular fuel cell choice for automotive vehicles. The PEMFC generally includes a proton exchange membrane (PEM), a cathode, and an anode. The anode and the cathode typically include finely divided catalytic particles, usually platinum and/or platinum alloy, supported on carbon particles and mixed with an ionomer. The catalytic mixture is deposited on opposing sides of the membrane. The combination of the anode catalytic mixture, the cathode catalytic mixture, and the PEM define a membrane electrode assembly (MEA). In order to facilitate the transport of reactant gases to and remove the excessive water and heat from the catalytic mixture, a gas diffusion layer (GDL), which may include a microporous layer and a carbon fiber based gas diffusion backing layer, is applied on either side of the MEA. GDLs also provide mechanical support for the soft goods including the PEM and catalytic mixtures.

MEAs are sandwiched between bipolar plates to form individual fuel cells. Current collectors and compression plates may also be added on either side of the fuel cell. The bipolar plates typically include an anode side and a cathode side. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. Coolant channels may be disposed between the anode and cathode sides of the bipolar plates to provide heat transfer functionality to the fuel cell.

Several fuel cells are typically combined in a fuel cell stack to generate the desired power. For example, the stack may include 200 or more fuel cells arranged in series. The fuel cell stack receives a cathode reacting gas, typically a flow of air forced through the stack by a compressor. Not all the oxygen is consumed by the stack and some of the air is output as a cathode exhaust gas that may include water as a stack byproduct. The fuel cell stack also receives an anode hydrogen reacting gas that flows into the anode side of the stack. Gases are diffused by the GDL on either side of the MEA. Contacting the catalytic particles, typically platinum particles supported on carbon particles, hydrogen (dihydrogen) splits into protons $H^+$ and electrons $e^-$. Electrons, unable to pass through the MEA, travel along an external load circuit to the cathode side of the MEA creating the current output of the fuel cell. In doing so, electrons may travel through the GDL, the bipolar plates, the current collectors, and/or compression plates. Protons H⁺ pass through the MEA to the cathode side. At the cathode side of the MEA, electrons combine with oxygen (dioxygen) in the presence of catalytic particles to form O²⁻. Protons H⁺ react with ions H⁺ to form water and heat. Water is then typically transported out of the fuel cell with air flow.

Referring to FIG. 1, to accommodate the above-mentioned electrochemical reaction in a fuel cell stack 200, a fuel system 100, on the cathode side 102, may comprise an air blower or compressor 106 situated downstream from an air filter 104, a cooler 108, and a (de)humidifier 110. On the anode side 112, the fuel system 100 may comprise a hydrogen reservoir 114, a regulator 116, and a pressure control valve 118. The anode side 112 may also include a recirculation apparatus 120. The fuel system 100 may further comprise a heat and water management system 122.

FIG. 1 is merely an example embodiment of a structure of the fuel system 100 and is not meant to necessitate or exclude any components shown or not shown or exclude any other arrangement of the same. For example, the recirculation apparatus 120 (or a regenerative blower) may return the unused hydrogen of the fuel cell stack 200 to different locations across the path of hydrogen at the anode side 112. For instance, the unused hydrogen may be returned to the path of hydrogen flow before or after one or more of hydrogen injectors (not shown). Nevertheless, the anode side of the fuel cell stack is usually a closed system. As the fuel cell operates and consumes hydrogen, additional hydrogen is periodically injected into the closed anode system to maintain pressure and hydrogen concentration for the operation of the fuel cell stack. Accumulated nitrogen and water are also periodically purged out of the anode system when needed to maintain the hydrogen concentration.

Since hydrogen in both gas and liquid phases has an extremely low density, to extend the range of fuel cell powered vehicles, hydrogen must first be compressed to approximately 700 ATM (70 MPA) to achieve an adequate fuel density.

Figure 2:
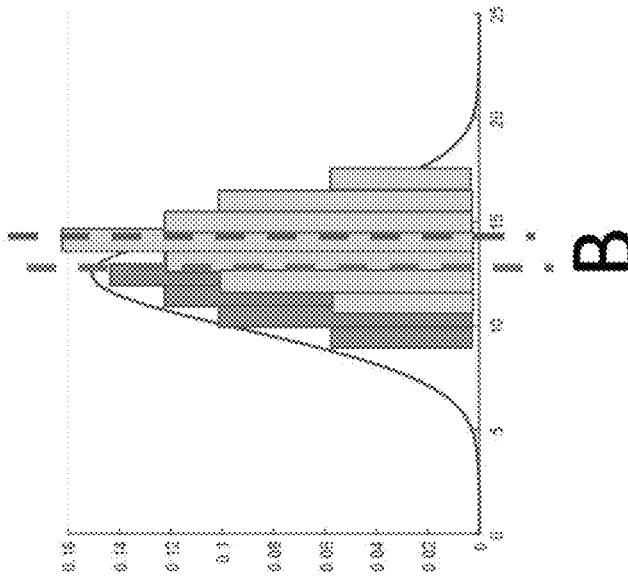
FIG. 2 is an example shift of injector duty cycle over the lifetime of a fuel cell stack.
Figure 2:
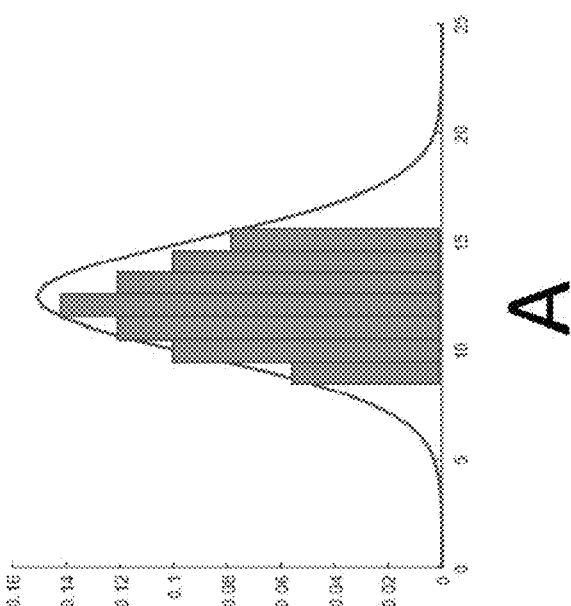

To detect hydrogen leakage, a controller may monitor the operation of each component of the fuel cell system including components auxiliary to the fuel cell stack. For example, the controller may monitor the duty cycle of hydrogen injectors, air compressor speed, stack voltage output, pressure drop, and temperature variations across the stack, auxiliary components, and the piping. For ease of explanation, the present disclosure discusses the example of monitoring of the duty cycle of hydrogen injectors. It is to be understood, however, that other scenarios are also possible. Accordingly, in some embodiments, to detect hydrogen leakage, a controller may monitor the duty cycle of hydrogen injectors at pre-defined power levels and compare them against a calibrated value. Since these calibrated values are acquired through offline testing at the beginning of the fuel cell stack life, they become inapplicable as the fuel cell stack ages. For example, as the fuel cell stack ages, the idling current and the nominal duty cycle of the hydrogen injector while idling both change in comparison with their starting values. FIG. 2 demonstrates how the calibrated values of duty cycle of hydrogen injectors change from their initial evaluation at the beginning of fuel cell stack life (FIG. 2A) over time (FIG. 2B). Accordingly, there is a need for a mechanism to accurately detect hydrogen leakage by comparing the duty cycle of hydrogen injectors with calibration values that account for aging of the system as time passes. As stated previously, this comparison may be effectuated using any operating parameters of or related to the fuel cell system.

To address the above-mentioned shortcomings, a control software may be utilized to, using statistical methods, calculate the average injector duty cycle in real time, at pre-defined power levels, and transmit the calculated value to a data processing unit, through connected vehicle technologies in real time. In some embodiments, the pre-defined power level is at idling of the stack. The data processing unit collects the calculated values from a fleet of vehicles, having similar aging and operating conditions, and processes the same, using statistical analysis, to determine an updated calibration value. In some embodiments, the updated calibration value is then compared by the data processing unit with the injector duty cycle of each individual vehicle to identify the outlier vehicles—i.e., those that appear to leak hydrogen. The data processing unit may then, using connected vehicle technologies, inform the operator of the leakage and of the need for a service event or initiate a protocol to assure of the issue across different power levels and temporarily remedy the issue. For example, if the difference between the updated calibration value and the injector duty cycle of a particular vehicle exceeds a predetermined amount, the data processing unit may cause the vehicle to purge the fuel cell stack of nitrogen. In other embodiments, upon determination of the updated calibration value by the data processing unit, this value is transmitted back to each individual vehicle for on-board comparison with the updated value. In such embodiments, if the difference between the updated calibration value and the actual injector duty cycle exceeds a predetermined amount, the vehicle may purge the system of nitrogen and reevaluate the injector duty cycle at different power levels to pinpoint the issue. This is because a system may have a leakage at high hydrogen pressures (i.e., higher demand for electrical output) but not at lower hydrogen pressures. Assuming that leakage is detected, the vehicle may initiate a protocol to remedy the issue. For example, the vehicle may reduce the power output or shut off the hydrogen tank altogether.

Figure 3:
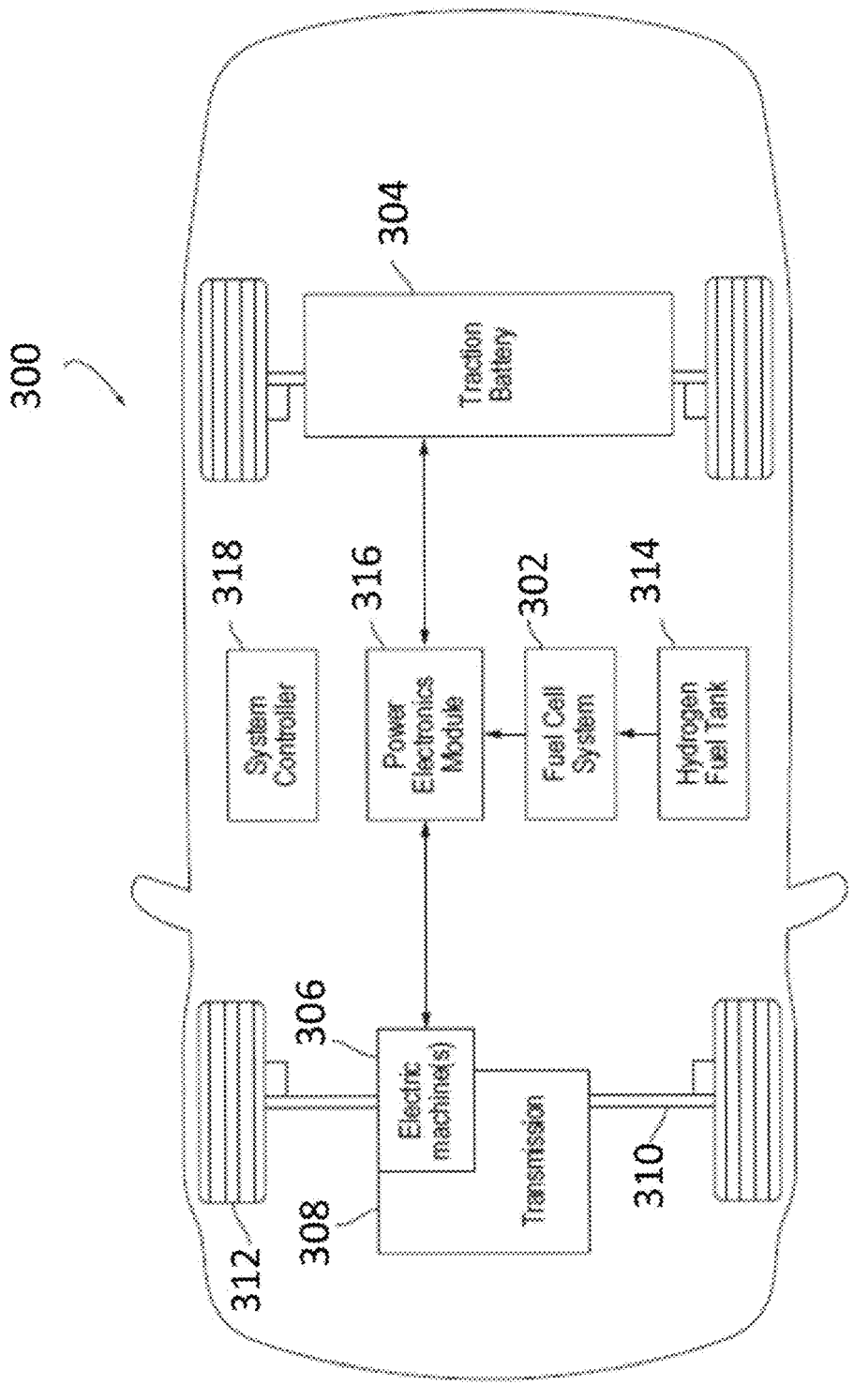
FIG. 3 is a simplified schematic of a fuel cell vehicle.

Referring now to FIG. 3, a block diagram of an exemplary fuel cell electric vehicle (FCEV) 300 having a fuel cell system 302 and a traction battery 304 is illustrated. The fuel cell system 302 and the traction battery 304 are individually operable for providing electrical energy for propulsion of the FCEV 300. The fuel cell system 302, connected to a hydrogen fuel tank 314, includes one or more fuel cell stacks (not shown), which may be electrically connected in series. The fuel cell system 302 further includes auxiliary equipment such as an electric compressor for the fuel cell system air supply. The FCEV 300 may further include one or more electric machines 306 mechanically connected to a transmission 308. The electric machine 306 may be capable of operating as a motor and as a generator. In other words, the electric machine 306 drawing energy from the fuel cell system 302 can propel the FCEV 300 and/or recharge the traction battery 304. The transmission 308 is mechanically connected to a drive shaft 310 mechanically connected to wheels 312 of the FCEV 300. The electric machine 306 may provide propulsion and slowing capability for the FCEV 300. The electric machine 306 acting as a generator may recover energy that may normally be lost as heat in a friction braking system. The energy recovered by the electric machine 306 may be used to recharge the traction battery 304.

Further, the fuel cell system 302 may be electrically connected to the electric machine 306 via a power electronics module 316. The power electronics module 316, having an inverter or the like, may provide the ability to transfer electrical energy from the fuel cell system 302 to the electric machine 306. For example, it may convert the electrical energy derived from the fuel cell system 302 into electrical energy having a form compatible for operating the electric machine 306.

The battery 304, which may store electrical energy for use by the electric machine 306, may be also electrically connected to the electric machine 306 via the power electronics module 316. The power electronics module 316 may provide the ability to bi-directionally transfer electrical energy between the battery 304 and the electric machine 306. For example, the battery 304 may also provide DC electrical energy while the electric machine 306 may require the three-phase AC electrical energy to function. The power electronics module 316 may convert the electrical energy from the battery 304 into electrical energy having a form compatible for operating the electric machine 306. In this way, the FCEV 300 may be further configured to be propelled with the use of the battery 304 individually or in combination with the fuel cell system 302.

The fuel cell system 302 and the battery 304 may have one or more associated controllers to control and monitor the operation thereof. The controllers may be microprocessor-based devices. The controllers may communicate via a serial bus (e.g., Controller Area Network (CAN)) or via discrete conductors. For example, a system controller 318 (i.e., a vehicle controller) may be configured to coordinate or control the operation of the fuel cell system 302 and the battery 304. In operation for propelling the FCEV 300, the system controller 318 may interpret and split a driver power demand into a fuel cell system power request and a battery power request. In turn, the fuel cell system 302 may be controlled to output electrical power corresponding to the fuel cell system power request to the electric machine 306 for use in propelling the FCEV 300. Likewise, the battery 304 may be controlled to output electrical power corresponding to the battery power request to the electric machine 306 for use in propelling the FCEV 300.

The system controller 318 may be implemented as one or more controllers, processors or any device having data processing and communication capabilities to operate and control various operations of the FCEV 300. For example, the system controller 318 may be configured to communicate with various components of the FCEV 300 via one or more in-vehicle networks. The in-vehicle network may include, but is not limited to, one or more of a controller area network (CAN), an Ethernet network, and a media-oriented system transport (MOST), as some examples. Similarly, the system controller 318 may be configured to wirelessly communicate with a mobile device of a vehicle user(s)/occupant(s) via a wireless connection. The system controller 318 may be further configured to communicate with a telematics control unit (TCU) configured to control telecommunication between FCEV 300 and a wireless network through a wireless connection using a modem. The wireless connection may be in the form of various communication networks, for example, a cellular network. Through the wireless network, the vehicle may access one or more cloud servers to access various content for various purposes. It is noted that the terms wireless network, cloud and server are used as general terms in the present disclosure and may include any computing network involving carriers, router, computers, controllers, circuitry or the like configured to store data and perform data processing functions and facilitate communication between various entities.

In the present disclosure, the system controller 318, via its processor(s), may determine an average duty cycle of the injectors at pre-defined power levels such as during idling of the fuel cell stack, and transmit data off board indicative of that value. Further, the system controller 318, via its processor(s), may acquire a crowdsourced average duty cycle of other fuel cell vehicle injectors, and compare the same with the calculated average duty cycle of the injectors during idling of the fuel cell stack. If the crowdsourced average is determined to be different than the calculated average duty cycle of the injectors during idling of the fuel cell stack by a pre-determined amount, the system controller 318, via its processor(s), may initiate one or more protocols. For example, if the comparison between the crowdsourced average duty cycle and the calculated value of the vehicle 300 indicates that there is significant leakage of hydrogen, the system controller 318, via its processor(s) may command purging of the fuel cell system 302 with nitrogen to repeat the calculations at different power levels. In some embodiments, in addition to or instead of purging the fuel cell system 302 of nitrogen, the system controller 318, via its processor(s), may reduce the power drawn from the fuel cell system 302 or shut off the flow of hydrogen to the fuel cell system 302 from hydrogen fuel tank 314.

If the comparison between the crowdsourced average duty cycle and the calculated value for the vehicle 300 indicates that there is some minimal leakage of hydrogen, the system controller 318, via its processor(s), may command a service event or receive a command for the service event from the off-vehicle site (a data processing unit), which determined the crowdsourced average duty cycle. Still further, upon determination of discrepancy between the crowdsourced average duty cycle and the calculated value for the vehicle 300, the system controller 318, via its processor(s), may isolate different sections of the hydrogen flow path from the hydrogen fuel tank 314 to the fuel cell 302 to determine the cause of hydrogen leakage. In some embodiments, this process may require isolating off a section of the path, for example by closing the valves for the inlet and outlet and examining the pressure and concentration of the hydrogen in each section over time.

Indeed, the same process may be applied to any component of the fuel cell system including auxiliary components to the fuel cell stack. For example, operation of a fuel cell vehicle in general relies on an air compressor to maintain certain pressure in the fuel cell system for normal operation. The efficiency of the air compressor is important for the fuel cell system as the compressor works as a substantial parasite load. It may, however, be difficult to diagnose if the compressor has a defect or the air system has any kind of blockage. Using the system disclosed here, by examining the compressor speed, power, flow rate, and the achieved fuel cell stack power, using a vehicle's controllers and processors, and comparing the same with a crowdsourced value of the same parameters from a fleet of vehicles, one can identify if any fuel cell vehicle's compressor is consuming more power than others in the same fleet.

In short, in some embodiments, a vehicle comprising at least one fuel cell stack arranged to generate power for propulsion and an auxiliary fuel cell stack component is disclosed. This vehicle further comprises a processor programmed to acquire a crowdsourced average operating parameter of an auxiliary fuel cell stack component of other fuel cell vehicles, and responsive to the crowdsourced average being different, for a pre-defined power level, than an operating parameter of the auxiliary fuel cell stack component by a pre-determined amount, purge the fuel cell stack of nitrogen, reduce the power drawn from the fuel cell, shut off flow of hydrogen to the fuel cell stack, or schedule a service event. In some embodiments, the auxiliary fuel cell stack component is at least one hydrogen injector, and the average operating parameter is average duty cycle. In one embodiment, the pre-defined power level is at idling of the fuel cell stack.

In other embodiments, a vehicle comprising at least one fuel cell stack arranged to generate power for propulsion and an auxiliary fuel cell stack component is disclosed. This vehicle further comprises a processor programmed to, for a predefined power level, transmit data off board indicative of an average operating parameter of the auxiliary fuel cell stack component and receive a command to schedule a service event. The auxiliary fuel cell stack component may be at least one hydrogen injector and the average operating parameter may be an average duty cycle. In addition, the predefined power level may be at idling of the fuel cell stack. In some embodiments, the processor is further programmed to acquire a crowdsourced average operating parameter of an auxiliary fuel cell stack component of other fuel cell vehicles. Indeed, the command to schedule the service event may be a result of a comparison between the average operating parameter of the auxiliary fuel cell stack component and the crowdsourced average operating parameter of other fuel cell vehicles. Still in other embodiments, the processor may be programmed to, responsive to the crowdsourced average being different than the average operating parameter of the auxiliary fuel cell stack component, for a predefined power level, by a pre-determined amount, purge the fuel cell stack of nitrogen, reduce a power drawn from the fuel cell stack, or shut off flow of hydrogen to the fuel cell stack.

In addition, a data processing unit comprising a processor programmed to collect real time data indicative of, for each of a plurality of fuel cell power vehicles, an operating parameter of an auxiliary fuel cell component is disclosed. This processor may further be programmed to command a service event for at least one of the vehicles responsive to the at least one having an average operating parameter different than an average of an operating parameter of the plurality of fuel cell powered vehicles by an amount greater than a predefined threshold. This threshold may depend on a difference between a minimum and a maximum of an operating parameter of the auxiliary component. In some embodiments, the service event includes a time period during which the vehicle should undergo the service event. In other embodiments, the processor may be programmed to command a purging of the fuel cell stack of nitrogen, a reduction of power drawn from the fuel cell, or a shut off of flow of hydrogen to the fuel cell stack for at least one of the vehicles responsive to the at least one having an operating parameter different than an average of the operating parameters by an amount greater than a predefined threshold.

While example embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a fuel cell stack arranged to generate power for propulsion;
an auxiliary fuel cell stack component; and
a processor programmed to, responsive to a crowdsourced average value of an operating parameter of an auxiliary fuel cell stack component of other fuel cell vehicles being different, for a pre-defined power level, than an average value of a same operating parameter of the auxiliary fuel cell stack component by a pre-determined amount, purge the fuel cell stack of nitrogen.

2. The vehicle of claim 1, wherein the auxiliary fuel cell stack component is at least one hydrogen injector and wherein the operating parameter of the auxiliary fuel cell stack component of other fuel cells vehicles is duty cycle.

3. The vehicle of claim 1, wherein the pre-defined power level is at idling of the fuel cell stack.

4. The vehicle of claim 1, wherein the processor is further programmed to, responsive to the crowdsourced average value being different than the average value by the pre-determined amount, reduce power drawn from the fuel cell stack.

5. The vehicle of claim 1, wherein the processor is further programmed to, responsive to the crowdsourced average value being different than the average value by the pre-determined amount, shut off flow of hydrogen to the fuel cell stack.

6. The vehicle of claim 1, wherein the processor is further programmed to, responsive to the crowdsourced average value being different than the average value by the pre-determined amount, schedule a service event.

7. A vehicle comprising:
at least one fuel cell stack arranged to generate power for propulsion;
an auxiliary fuel cell stack component; and
a processor programmed to
for a predefined power level that is at idling of the at least one fuel cell stack, transmit data off board indicative of an average value of an operating parameter of the auxiliary fuel cell stack component, and
receive a command to schedule a service event.

8. The vehicle of claim 7, wherein the auxiliary fuel cell stack component is at least one hydrogen injector and wherein the operating parameter is duty cycle.

9. The vehicle of claim 7, wherein the processor is further programmed to acquire a crowdsourced average value of a same operating parameter of an auxiliary fuel cell stack component of other fuel cell vehicles.

10. The vehicle of claim 9, wherein the command results from a comparison between the average value and the crowdsourced average value.

11. The vehicle of claim 9, wherein the processor is further programmed to, responsive to the crowdsourced average value being different than the average value for a predefined power level and by a predetermined amount, purge the fuel cell stack of nitrogen.

12. The vehicle of claim 9, wherein the processor is further programmed to, responsive to the crowdsourced average value being different than the average value for a predefined power level and by a predetermined amount, reduce a power drawn from the fuel cell stack.

13. The vehicle of claim 9, wherein the processor is further programmed to, responsive to the crowdsourced average value being different than the average value, for a predefined power level and by a predetermined amount, shut off flow of hydrogen to the fuel cell stack.

14. A data processing unit comprising:

a processor programmed to collect real time data indicative of, for each of a plurality of fuel cell powered vehicles, an operating parameter of an auxiliary fuel cell component, and command a service event for at least one of the vehicles responsive to the at least one having an average operating parameter value different than an average value of the operating parameters of the plurality of fuel cell powered vehicles by an amount greater than a predefined threshold.

15. The data processing unit of claim 14, wherein the service event includes a time period during which the at least one of the vehicles should undergo the service event.

16. The data processing unit of claim 14, wherein the predefined threshold depends on a difference between a minimum value and a maximum value of the operating parameter of the auxiliary fuel cell component.

17. The data processing unit of claim 14, wherein the processor is further programmed to command fuel cell stack purging of nitrogen for at least one of the vehicles responsive to the at least one having an operating parameter value different than an average value of the operating parameters by an amount greater than a predefined threshold.

18. The data processing unit of claim 14, wherein the processor is further programmed to command a reduction of a power drawn from a fuel cell for at least one of the vehicles responsive to the at least one having an operating parameter value different than an average value of the operating parameters by an amount greater than a predefined threshold.

19. The data processing unit of claim 14, wherein the processor is programmed to command a shut off of fuel cell stack flow of hydrogen for at least one of the vehicles responsive to the at least one having an operating parameter value different than an average value of the operating parameters by an amount greater than a predefined threshold.

* * * * *